United States Patent [19]

Kneringer et al.

[11] Patent Number: 5,740,955
[45] Date of Patent: Apr. 21, 1998

[54] PROCESS FOR THE MANUFACTURE OF A STRUCTURAL ELEMENT CAPABLE OF CARRYING HIGH THERMAL LOADS

[75] Inventors: Günter Kneringer, Reutte; Florian Rainer, Lechaschau; Laurenz Plochl, Breitenwang, all of Austria

[73] Assignee: Schwarzkopf Technologies Corporation, New York, N.Y.

[21] Appl. No.: 632,658

[22] Filed: Apr. 15, 1996

[30] Foreign Application Priority Data

May 2, 1995 [AT] Austria ................................ 742/95

[51] Int. Cl.$^6$ ..................................................... B23K 35/00
[52] U.S. Cl. ........................................... 228/122.1; 228/208
[58] Field of Search ............................ 228/122.1, 120, 228/208, 234.1, 254; 219/121.13, 121.14

[56] References Cited

U.S. PATENT DOCUMENTS 5,159,168  10/1992  Portmann et al. ........................ 219/81
5,428,882  7/1995  Makowiecki et al. ................ 228/124.1

FOREIGN PATENT DOCUMENTS

3416843 A1  11/1985  Germany .
WO 95/07869  3/1995  WIPO .

*Primary Examiner*—Samuel M. Heinrich
*Attorney, Agent, or Firm*—Morgan & Finnegan, L.L.P.

[57] ABSTRACT

A process for manufacturing a structural element capable of carrying high thermal loads, such as a heat shield for fusion reactors. The structural element comprises components of high heat-resistant material (such as graphite) joined to metallic components. A metallic, ductile intermediate layer is applied to the components of high heat-resistant material and then, the components of high heat-resistant material and metallic components are joined by high-energy beam welding.

9 Claims, No Drawings

PROCESS FOR THE MANUFACTURE OF A STRUCTURAL ELEMENT CAPABLE OF CARRYING HIGH THERMAL LOADS

BACKGROUND OF INVENTION

1. Field of the Invention

The present invention relates to a process for the manufacture of a structural element capable of carrying high thermal loads, in which one or more components of high heat-resistant material are joined with at least one metallic component, where the components made of high heat-resistant material are coated with a metallic, ductile intermediate layer on the surface to be joined, before being joined together.

2. Description of the Prior Art

A typical example of such structural elements capable of carrying high thermal loads are diverters and limiters for fusion reactors, such as described, for instance, in DE-PS 34 16 843. According to this implementation of heat shields, graphite is used as a preferred material for the highly heat-resistant components, which are joined by brazing to the metallic components, shaped as tubes and functioning as coolant piping, preferably made of molybdenum. Silver-copper-based compounds are used as a brazing material for this purpose, since they adequately meet the high thermal requirements placed on the brazed joint.

One disadvantage of heat shields of this type, however, is that, because of the stringent requirements regarding heat resistance, good heat conductivity and a heat expansion of the individual components which are as similar as possible in order to avoid excessive thermomechanical strains, both during the brazing process and during operation, usually only relatively expensive materials can be utilized for the metallic parts, such as molybdenum or molybdenum alloys.

There have been a number of attempts to utilize less expensive materials for the metallic components, such as copper or nickel-iron alloys. Since these materials, in contrast to molybdenum, have a thermal expansion coefficient significantly different from graphite, utilization of these materials required adding an intermediate layer to assure good adhesion of all areas of the separate components, even under high cyclical heat stress.

A structural element of this type capable of carrying high thermal loads has been described, for instance, in WO95/07869. However, even structural elements of this type has frequently been found unsuitable because the use of copper or nickel-iron alloys for the metallic parts often does not permit achieving the required high thermal strength.

One possibility for increasing the thermal strength of such structural elements without having to again revert to expensive molybdenum for the metallic components is the utilization of high heat-resistant alloys (such as copper alloys) that are dispersion-hardened or precipitation-hardened. However, a disadvantage of these materials is that their favorable mechanical strength properties will be significantly impaired by even a brief exposure to high temperatures. Temperatures such as those that occur during brazing of these materials to the graphite components are usually already capable of impairing strength values to an unacceptable degree.

SUMMARY OF THE INVENTION

An objective of the present invention is to create a process for manufacturing a structural element capable of carrying high thermal loads, in which those components made of heat-resistant material are joined to the metallic components in a manner which avoids unacceptable thermal strain between the individual components and also permits the use of favorably priced materials of high thermal resistance for the metallic parts without losing their good strength properties during the joining process.

In accordance with the present invention, this and other objects are achieved through joining the components by means of high-energy beam welding. Well-known processes for high-energy beam welding are, for instance, electron beam welding or laser welding. In preparation for the high-energy beam welding process of the present invention, the components of heat-resistant material are coated with a ductile metallic intermediate layer. Application of the intermediate layer prior to joining the heat-resistant materials to the metallic components has the advantage that process temperatures are limited only by the properties of the heat-resistant material. Use of this intermediate layer provides excellent joining of the individual components by means of subsequent high-energy beam welding, while the strength properties of the metallic components are not affected.

The foregoing specific object and advantages of the invention are illustrative of those which can be achieved by the present invention and is not intended to be exhaustive or limiting of the possible advantages which can be realized. Thus, this and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

DETAILED DESCRIPTION OF THE INVENTION

According to the present invention, a process is provided for manufacturing a structural element capable of carrying high thermal loads, in which components made of heat-resistant material are joined to metallic components by means of high-energy beam welding. Suitable well-known processes for high-energy beam welding include electron beam welding or laser welding.

In preparation for the high-energy beam welding process, the components of heat-resistant material (such as graphite, ceramic materials or tungsten) are coated with a ductile metallic intermediate layer. This intermediate layer may be applied by established techniques, such as backing up, plasma spraying or other suitable techniques that assure good adhesion of the intermediate layer to the heat-resistant material.

Application of the intermediate layer prior to joining the heat-resistant materials to the metallic components has the advantage that process temperatures are limited only by the properties of the heat-resistant material. Use of the intermediate layer provides excellent joining of the individual components by means of subsequent high-energy beam welding, while the strength properties of the metallic components are not affected.

Since the ductile intermediate layer has poor high-temperature properties, its thickness should preferably be kept to a minimum. As is well known, a welding operation will result in a melting of the material in the immediate vicinity of the welding location. Experts would therefore anticipate that the use of a welding process for joining components made of heat-resistant materials with a very thin intermediate layer to the metallic parts would have serious disadvantages regarding the adhesion of the intermediate layer to the heat-resistant material. As a complete surprise, however, due to the use of high-energy beam welding as a welding technique, there is no negative effect on the adhesion of the intermediate layer to the heat-resistant material, even with the required minimal thickness of the intermediate layer. The high-energy beam welding process permits a uniform width of the weld across its entire depth. Warping of the joined structural element is extremely slight.

Use of the process according to the present invention is particularly advantageous for manufacturing a structural element capable of carrying high thermal loads when using graphite (preferably graphite reinforced with carbon fiber) for the heat-resistant material, as well as a highly heat-resistant copper alloy for the metallic component.

It is preferable that the intermediate layer comprise pure copper or a copper alloy with a thickness of between 0.5 and 2 mm.

However, the present invention is by no means limited to the advantageous types of implementation cited above. For instance, next to graphite, ceramic materials as well as tungsten are suitable as the heat-resistant material. With respect to the intermediate layer, for example, chromium or high-chromium alloys with added copper and/or nickel are suitable.

The present invention is further described below by means of the following implementation examples.

EXAMPLE 1

A cooling module for fusion reactors based on the "Flat Tile Design" was manufactured as follows:

Five tiles of carbon fiber-reinforced graphite, having a size of $26\times32\times10$ mm$^3$, were given a surface structure by means of a pulsed laser beam on the surfaces to be joined. They were then backed up with a pure copper layer of 2 mm thickness in a vacuum furnace at a temperature of approximately 1100° C. The tiles thus coated were placed with their coated surface on a rod made of a precipitation-hardened copper-chromium-zirconium alloy having a size of $32\times32\times130$ mm$^3$ and were joined together using an electronic beam welding machine.

The welding parameters were chosen so that the weld seam reached down almost to the tile surface, the width of the weld seam being as constant as possible in this area.

EXAMPLE 2

A cooling module for fusion reactors based on the "Monoblock Design" was manufactured as follows:

Holes of 15 mm were drilled into two carbon fiber-reinforced graphite tiles having a size of $30\times22\times20$ mm$^3$. The drilled surface was then roughened by means of placing holes of approximately 100 µm diameter vertical to the surface with a pulsed laser. After cleaning, the graphite component was annealed in a vacuum at 1200° C. for 60 minutes. The drilled surface was completely covered with titanium foil of 20 µm thickness.

An ultrasonically cleaned copper tube with a wall thickness of 2 mm was then inserted into the drilled hole, making a tight joint with the titanium foil. A graphite core was fitted tightly into the interior of the copper tube. By melting down the copper tube, the drilled holes in the tile were backed up with the copper tubing. The backed-up copper tubing was shaved down mechanically to a wall thickness of 1 mm.

The tiles thus backed up were then slid onto a tube of a dispersion-hardened copper alloy with a tight fit. To separate the tiles from each other and to avoid overlapping weld seams, the tubes of dispersion-hardened copper alloy were fitted with radial grooves directly adjoining the tile ends. The individual tiles were then welded to the tube of dispersion-hardened copper alloy along the circumference of the tube. The welded joints were also checked for possible welding defects by means of metallographic tests and ultrasonic surveys. As such, it was confirmed that the welded joints were in perfect condition.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

We claim:

1. A process for manufacturing a structural element capable of carrying high thermal loads, wherein one or more components of high heat-resistant material comprising carbon fiber-reinforced graphite are joined with at least one metallic component, comprising the steps of:

coating the components of high heat-resistant material with a metallic, ductile intermediate layer on the surface to be joined; and joining said one or more components of high heat-resistant material to said at least one metallic component by high-energy electron beam welding.

2. A process for manufacturing a structural element capable of carrying high thermal loads, wherein one or more components of high heat-resistant material are joined with at least one metallic component comprising a high heat-resistant copper alloy, comprising the steps of:

coating the components of high heat-resistant material with a metallic, ductile intermediate layer on the surface to be joined; and joining said one or more components of high heat-resistant material to said at least one metallic component by high-energy electron beam welding.

3. The process for manufacturing a structural element capable of carrying high thermal loads according to claim 1, wherein the metallic component comprises a high heat-resistant copper alloy.

4. The process for manufacturing a structural element capable of carrying high thermal loads according to claim 1, wherein the intermediate layer comprises pure copper or a copper alloy.

5. The process for manufacturing a structural element capable of carrying high thermal loads according to claim 2, wherein the intermediate layer comprises pure copper or a copper alloy.

6. The process for manufacturing a structural element capable of carrying high thermal loads according to claim 3, wherein the intermediate layer comprises pure copper or a copper alloy.

7. The process according to claim 4, wherein the thickness of the intermediate layer is between 0.5 and 2 mm.

8. The process according to claim 5, wherein the thickness of the intermediate layer is between 0.5 and 2 mm.

9. The process according to claim 6, wherein the thickness of the intermediate layer is between 0.5 and 2 mm.

* * * * *